United States Patent

Himmelsbach

[11] Patent Number: 5,860,595
[45] Date of Patent: Jan. 19, 1999

[54] MOTOR VEHICLE HEAT EXHANGER

[76] Inventor: Johann Himmelsbach, Kalkofen 11, Lindlar, D-51789, Germany

[21] Appl. No.: 793,579
[22] PCT Filed: Aug. 25, 1995
[86] PCT No.: PCT/DE95/01149
§ 371 Date: Feb. 28, 1997
§ 102(e) Date: Feb. 28, 1997
[87] PCT Pub. No.: WO96/06748
PCT Pub. Date: Mar. 7, 1996

[30] Foreign Application Priority Data

Sep. 1, 1994 [DE] Germany .......................... 44 31 107.9
Sep. 1, 1994 [DE] Germany .......................... 44 31 191.5
Sep. 1, 1994 [DE] Germany .......................... 44 31 192.3

[51] Int. Cl.⁶ .................................................... B60H 1/02
[52] U.S. Cl. ................................................ 237/12.3 B
[58] Field of Search ................... 237/12.3 B, 12.3 A; 165/103, 176

[56] References Cited

U.S. PATENT DOCUMENTS

| | | | |
|---|---|---|---|
| 4,508,264 | 4/1985 | Tekeda et al. | 237/12.3 B |
| 4,657,180 | 4/1987 | Hayashi | 237/12.3 R |
| 4,705,214 | 11/1987 | Johnson | 237/12.3 C |
| 4,781,242 | 11/1988 | Meijer et al. | 165/32 |
| 4,884,744 | 12/1989 | Padgaonkar | 237/12.3 R |
| 4,911,110 | 3/1990 | Isoda et al. | 123/41.14 |
| 4,930,455 | 6/1990 | Creed et al. | 123/41.1 |
| 5,092,521 | 3/1992 | Brown | 237/12.3 B |
| 5,192,021 | 3/1993 | Meier et al. | 237/2 A |
| 5,203,498 | 4/1993 | Kajikawa | 237/2 A |
| 5,215,044 | 6/1993 | Banzhaf et al. | 123/41.29 |
| 5,337,704 | 8/1994 | Roth | 123/41.1 |
| 5,366,150 | 11/1994 | Kaimoto et al. | 237/2 A |
| 5,388,423 | 2/1995 | Khelifa | 62/238.3 |
| 5,413,279 | 5/1995 | Quaas et al. | 237/12.3 C |
| 5,419,287 | 5/1995 | Evans | 123/41.29 |

Primary Examiner—Henry A. Bennett
Assistant Examiner—Derek S. Boles
Attorney, Agent, or Firm—Diller, Ramik & Wight, PC

[57] ABSTRACT

The invention relates to a process for heating the passenger compartments of motor vehicles by means of the heat given off by the engine (1) via the coolant which is taken back to the engine (1) through coolant lines via a heat exchanger to heat the passenger compartment, and a device for implementing the process. The heating capacity provided for the passenger compartment can be markedly increased by the use of a counterflow heat exchanger (3) and reducing the coolant flow through the engine (1) and/or the heat exchanger (3) by a proportion determined by the permissible limit values of engine cooling. A counterflow characteristic can be obtained, in particular, by the series connection of conventional cross-flow heat exchangers. Further improvements are possible by specially designing the heat exchanger fins and the dimensions and insulation of the coolant lines (2, 4). The process of the invention is particularly applicable to additional heat sources fitted upstream of the passenger compartment heat exchanger.

42 Claims, 10 Drawing Sheets

MOTOR VEHICLE HEAT EXHANGER

BACKGROUND OF THE INVENTION

The invention relates to a process for heating the passenger compartments of motor vehicles by means of the waste heat given off by the engine via the liquid or gaseous coolant, which is fed back to the engine through coolant lines via a passenger compartment heat exchanger in order to heat the passenger compartment, and a device for implementing the process.

Against the backdrop of constant improvements in the efficiency of combustion engines, drive technology and aerodynamics in motor vehicle construction, simple thermodynamic considerations quickly make it apparent that considerably more efficient methods must be developed in future for utilising the waste heat given off by the engine for heating purposes, particularly for heating the passenger compartment.

Depending on the efficiency and the driving situation, vehicles with highly efficient diesel engines already on the market today display problems with heating the passenger compartment under extreme climatic conditions: in addition to the very slow heating-up of the engine and the passenger compartment, the heating capacity while driving at low loads is often insufficient to achieve a comfortable climate in the passenger compartment, even after a relatively long journey.

Therefore, some motor vehicle manufacturers are trying to eliminate this heating capacity deficit by means of an additional, fuel-fired or electrically heated heat source, as sufficient heating capacity for the passenger compartment could not be provided by optimising the coolant system alone. This is not surprising at first glance, as the coolant/heating systems currently on the market are already the product of many years' optimisation involving variation of the coolant, fresh-air and circulating-air mass flows, as well as the geometry and position of the passenger compartment heat exchangers and control valves.

Furthermore, the loss of heat to the surrounding environment can, for example, be reduced by thermal encapsulation of the engine, improvement of the insulation of the passenger compartment, recovery of heat from the exhaust gas, an increase in the circulating air mass flow in the passenger compartment or even by recovery of the heat still contained in the air escaping from the passenger compartment into the surrounding environment via a waste-air/fresh-air heat exchanger, meaning that the use of additional heating systems or heating energy can be at least partly dispensed with.

However, these measures entail considerable additional costs, which renders them unattractive, particularly for smaller vehicles. That said, precisely this class of vehicles in conjunction with highly efficient engines already has very low fuel consumption and thus also little waste heat for heating purposes as a result of their low mass.

The invention is based on the task of creating an efficient and low-cost process for reducing the loss of heat to the surrounding environment for motor vehicles with coolant-heated passenger compartments, so that as little additional heating energy as possible is needed to heat the passenger compartment. At the same time, the heating-up time of the engine is to be reduced and undercooling of the engine when stationary avoided as far as possible, with modifications to existing vehicle components being kept to a minimum.

Furthermore, a device for implementing the process is to be created which is to be as simple and inexpensive as possible to manufacture and use.

SUMMARY OF THE INVENTION

According to the invention, the task is solved in that a passenger compartment heat exchanger with counterflow characteristics is used and the coolant mass flow through the engine and/or passenger compartment heat exchanger is reduced, at least intermittently, towards a proportion determined by the permissible limit values of engine cooling in order to increase the heating capacity provided for the passenger compartment.

As is common knowledge, the limit values of engine cooling, and thus of the potential reduction of the coolant mass flow, are defined by the maximum permissible pressure and the maximum permissible temperature in the cooling system, the amount of heat to be dissipated by the engine, the ambient temperature, the temperature of the coolant upon entering the engine and the specific heat capacity of the coolant.

In conventional cross-flow passenger compartment heating systems, the coolant mass flow through the engine in many operating situations is much higher than the value necessary for engine cooling, often more than ten times higher, regardless of the heating capacity needed in the passenger compartment, in order to optimise the temperature distribution in the engine, the temperature of the combustion chamber walls, the coolant flow velocity and the rate of heat transfer to the passenger compartment air. This also applies to the coolant mass flows through the passenger compartment heat exchanger when the thermostat is closed when driving in winter.

Furthermore, the experts agree that, above a certain limit, increasing the coolant mass flow or the heat exchanger surface area is incapable of bringing about a marked improvement in the heating capacity in the passenger compartment. The air temperature at the passenger compartment heat exchanger outlet is "saturated".

The reduction of the coolant mass flow through the engine and/or the passenger compartment heat exchanger according to the invention is, however, thoroughly expedient as, in addition to the transfer of heat from engine to coolant, coolant to passenger compartment heat exchanger fins and passenger compartment heat exchanger fins to passenger compartment air, the loss to the surrounding environment also has to be taken into consideration, which has not previously been the case.

Some previously known passenger compartment heating systems with cross-flow passenger compartment heat exchangers display differences of less than 10 K in the coolant temperatures at the engine inlet and outlet points. The same is true at the passenger compartment heat exchanger when the engine is warm. In this context, the temperature difference between the engine inlet and outlet can be far smaller still in the case of the coolant systems with a passenger compartment heat exchanger lying parallel to the small coolant circuit.

This is the reason for the previous opinion that a counterflow passenger compartment heat exchanger brings hardly any advantages as the air temperature at the passenger compartment heat exchanger outlet is virtually "saturated" in this context, i.e. the air temperature is almost as high as the coolant temperature. Thus, only an increase of around 5 K in the air temperature at the heat exchanger outlet can be expected following a temperature drop of 10 K on the coolant side when using a counterflow passenger compartment heat exchanger instead of a cross-flow design. This does not justify the markedly higher costs of the counterflow configuration in motor vehicle applications.

Furthermore, unnecessarily high heat losses occur in the coolant lines leading from the passenger compartment heat exchanger back to the engine, in the coolant pump and in the engine crankcase. The crankcase, in particular, not only dissipates heat over a large surface, but also has additional "thermal bridges" at the engine mount and the flange-mounted components.

If, however, the coolant mass flow is simultaneously reduced by a factor of 5, for example, according to the invention, the temperature drop at the passenger compartment heat exchanger increases from 10 K to 50 K, while the air outlet temperature hardly changes, i.e. the heating capacity in the passenger compartment is initially unchanged. However, the heat losses along the flow path from the passenger compartment heat exchanger outlet to the engine are drastically reduced by this. Additional improvement of the insulation of the coolant line leading to the passenger compartment heat exchanger and/or a reduction of its cross-section, which is no problem if the coolant mass flow is reduced, results in a further reduction of the heat lost to the surrounding environment. The coolant line leading back to the engine is of secondary importance in this context owing to the reduced temperature level.

It is important for the process according to the invention that the engine outlet temperature of the coolant increases owing to the reduction of the heat lost to the surrounding environment in conjunction with the unchanged waste heat from the combustion process and that the heating capacity of the passenger compartment heat exchanger is also substantially increased as a result, as this is approximately directly proportional to the coolant inlet temperature—regardless of the coolant mass flow—as long as systems where the passenger compartment air is "saturated" on the temperature side are being considered. A temperature increase in the region of the cylinder head and in the coolant line leading to the passenger compartment heat exchanger is far more than compensated for by the reduction of the losses. Ultimately, the temperature drop at the passenger compartment heat exchanger is not increased from 10 to 50 K, but from 10 to 60 K, for example, by reducing the coolant flow rate by a factor of 5.

Negative effects of the process according to the invention on the combustion process or the pollutant emission of the engine are not to be expected. On the contrary, the coolant temperature in the immediate vicinity of the combustion chamber walls is higher than in the original configuration.

The process according to the invention not only achieves an increase in the maximum heating capacity under extremely cold conditions in winter, but also a reduction in the heating-up time of the engine in many driving situations involving passenger compartment heating.

However, it is not always expedient to concentrate as much heating capacity as possible on the passenger compartment. In the event of a low heating capacity requirement, the reduction of the coolant mass flow according to the invention can cause an excessively high coolant outlet temperature from the engine, which can result in the following adverse effects:

Localised overheating within the engine, vapour lock,
Excessive heat losses to the surrounding environment due to a high coolant temperature in the entire coolant circuit,
Drastic increase in the heat lost to the surrounding environment due to opening the thermostat for the large coolant circuit,
Unnecessary increase of the pumping capacity of the coolant pump.

In such operating conditions, it is expedient to completely, or at least partly, override the reduction of the coolant mass flow.

Various control strategies are conceivable for defining or detecting the point from which concentration of the waste heat on the passenger compartment is no longer expedient. In winter, for example, the option "maximum heating capacity" can be set via a valve in the coolant circuit by means of a manually operated switch. However, the coolant mass flow can also be automatically defined by switching or control valves which are activated when a certain ambient temperature is exceeded, for example. Furthermore, the load status of the engine can be detected by means of circuits and the reduction of the coolant mass flow overridden if a limit load or limit rpm speed is exceeded, for example if ⅔ of the nominal rpm speed or ⅔ of the nominal torque is exceeded. This measure is expediently used parallel to the detection of the heating requirement, for example via the coolant temperature or ambient temperature. As the measured and control variables mentioned are detected for controlling the engine anyway, these could be integrated into the engine management system.

A further control strategy is, for example, detection of the difference in coolant temperature between the engine outlet and inlet points. By detecting this variable, excessive mechanical stress caused by temperature gradients in the engine block can be avoided, for example. Deactivation above a specified temperature difference can also indirectly prevent excessive temperatures in the engine.

Overheating of the engine or opening of the thermostat for the large coolant circuit can be avoided by measuring the coolant temperature at the engine outlet or the vapour pressure in the coolant, or by detecting the pressure pulsation in the small cooling circuit. In the most simple configuration, the reduction of the coolant mass flow is to be overridden as soon as the measured variables mentioned exceed a limit value. However, more sensitive applications involving regulation of the coolant mass flow are also conceivable.

In order to achieve high increases in the heating capacity, it is expedient to reduce the coolant mass flow as much as possible. In extreme cases, the outlet temperature of the coolant from the counterflow passenger compartment heat exchanger can then be in the region of the ambient temperature, thus achieving minimum heat loss to the surrounding environment. To this end, it is expedient to regulate the coolant mass flow as a function of the coolant temperature at the heat exchanger outlet or of the difference relative to the ambient temperature. The ultimate magnitude of this temperature difference relative to the ambient temperature or of the absolute temperature level depends on whether an additional control unit is available to monitor the engine for localised overheating. This may be dispensed with under certain circumstances if a certain safety margin is observed, meaning that the corresponding costs can be saved.

In addition to the thermal stress, the necessary oil temperature must also be taken into consideration when reducing the coolant temperature at the engine inlet. This is important for energetic reasons, as well as for avoiding increased wear. Therefore, it may be advantageous to use part of the increase coolant temperature at the engine outlet specifically to heat the engine oil. An oil heat exchanger in the vicinity of the coolant outlet is expedient to this end.

As a complete energy balance of the motor vehicle shows, the reduction of the coolant mass flow through the engine and the passenger compartment heat exchanger according to the invention in conjunction with a counterflow passenger compartment heat exchanger is a highly effective measure for increasing the heating capacity in the passenger compartment—by way of reducing the heat lost to the surrounding environment—although a reduction of the coolant mass flow though the engine alone also enables a marked improvement in the passenger compartment heating capacity while reducing the heat lost to the surrounding environment, as the coolant temperature is increased to a higher value in this way. This results in a virtually linear increase in the passenger compartment heating capacity used for the motor vehicle. A potential increase in the heat lost to the surrounding environment by the feed line to the passenger compartment heat exchanger is compensated for by the greater amount of heat extracted from the coolant, caused by both the increase in the feed temperature and the counterflow arrangement, the reduction of the diameter of the feed line enabling a further reduction of the heat losses.

As already described, the air temperature at the outlet of the passenger compartment heat exchanger is at a higher level in the process according to the invention, this being equivalent to an increase in the heating capacity of the passenger compartment heat exchanger.

However, comfort in the passenger compartment is not determined by the heating capacity of the passenger compartment heat exchanger, but substantially by the temperature and atmospheric humidity in the passenger compartment. Around 20° to 30° C. can be regarded as the target temperature for the air in the passenger compartment at winter temperatures, which means that the entire air mass flow leaves the passenger compartment at this temperature in vehicles without circulating air. At an ambient temperature of −20° C. and an air temperature of +50° C. at the outlet of the passenger compartment heat exchanger, a waste air temperature of +25° C. signifies a heat utilisation rate of 35.7% in the passenger compartment.

If the air mass flow remains unchanged, the increase of the air temperature at the passenger compartment heat exchanger outlet from 50° C. to 60° C., enabled with certainty by the reduction of heat losses according to the invention, not only signifies a 14.3% increase in the heating capacity of the passenger compartment heat exchanger, but the corresponding reduction of the fresh-air mass flow also opens up the potential for improving the heat utilisation rate in the passenger compartment to 43.8%. Despite a higher passenger compartment heating capacity and given a corresponding reduction of the fresh-air mass flow, less heat is thus still extracted from the engine cooling circuit than in today's conventional coolant-heated passenger compartments. Via a corresponding increase in the return temperature of the coolant to the engine, these savings in turn affect the engine outlet temperature, this in turn affecting the efficiency of the passenger compartment heat exchanger, etc.

The latitude for such measures is limited by the maximum permissible coolant temperature and the necessary minimum air flow through the passenger compartment. In modern motor vehicles, the latter is primarily governed by the speed and outlet impetus of the air at the nozzles needed in order to protect the windows against misting, the mass flow needed in order to remove the atmospheric humidity produced by the passengers and the air mass flow needed in order to extract sufficient heat from the coolant for the passenger compartment. Furthermore, noise problems and the air flow perceived as a "draught" at excessive speeds also determine the mass flow.

Taking these boundary conditions into consideration, the potential reduction of the fresh-air mass flow in conjunction with the reduction of the coolant mass flow through the engine and the counterflow heat exchanger according to the invention is primarily limited by the danger of windscreen misting. The effect of the lower air velocity and lower air mass flow is, however, largely compensated for by the high temperatures of the air at the nozzle outlet of the windscreen defroster, in particular. In systems with circulating air, the outlet velocity of the air can also be adjusted in order to avoid windscreen misting.

Taking into account the ranges for the temperature and humidity of the ambient air to be expected in practical driving, as well as the share of atmospheric humidity produced by the vehicle passengers, it can be shown that the critical conditions "excessive humidity of the passenger compartment air" and "insufficient temperature of the passenger compartment air" do not normally occur simultaneously, at least if the engine is warm.

At extremely low temperatures, where some known vehicles already have heating problems, the humidity of the ambient air is so low that, once it has been heated to a temperature of +25° C. in the passenger compartment, the glazing need not be expected to mist, even if the fresh-air mass flow is reduced. Conversely, the danger of misting may be considerably higher at ambient temperatures around 0° C., but the available heating capacity is generally sufficient to ensure a pleasant passenger compartment temperature without any special measures being taken. In order to fulfil extreme heat requirements in the passenger compartment at low ambient temperatures, it is thus expedient to reduce the fresh-air flow through the passenger compartment heat exchanger. Apart from manual controls, automatic actuators which reduce the fresh-air flow below a certain ambient temperature or humidity of the ambient air are particularly suitable for this purpose. Of course, the relative atmospheric humidity in the passenger compartment can also be used as a signal for the reduction of the fresh-air throughput.

Further advantageous configurations of the process according to the invention are described in the sub-claims. In motor vehicles with electric motors as drives, for example, part of the heating capacity can be generated by controlling the electric drive energy.

Motor vehicles often display additional heating systems for additional heating of the passenger compartment. In such cases, the additional heat is to be primarily concentrated on the passenger compartment, this being done as efficiently and inexpensively as possible, i.e. with a minimum of additional heating energy from sources not serving to propel the vehicle, where the heating-up time of the engine is to be reduced if possible and as few modifications as possible made to the existing vehicle components.

Particularly effective use of the heating capacity of the additional heat source is possible by integrating the additional heat source into the process according to the invention, as well as taking the preferred configurations into consideration.

In hitherto known passenger compartment heating systems with cross-flow heat exchangers, the passenger compartment heating capacity is reduced to a greater or lesser degree when the coolant mass flow is reduced-if the additional heating is not switched on. This reduction initially results in a slight, then an excessive drop in the outlet temperature from the passenger compartment heat exchanger, while the engine outlet temperature of the coolant rises in return, thus partially compensating for the decrease in the passenger compartment heating capacity. The heat lost to the surrounding environment increases greatly as a result of the elevated engine temperature, meaning that a relatively high coolant flow through the passenger compartment heat exchanger is needed in order to ensure efficient passenger compartment heating of the type known to date. The input of additional heat via an additional heat source between the engine outlet and the passenger compartment heat exchanger thus results in only a slight increase in the coolant temperature and the effective heating capacity in the passenger compartment in such a coolant system with a high coolant throughput. A noticeable increase in the passenger compartment heating capacity is ultimately only produced by the gradual increase in the engine temperature, which is extremely inefficient owing to the high amount of heat lost to the surrounding environment. In some cases, for example, only 50% of the additional capacity input by the additional heating reaches the passenger compartment via the heating heat exchanger.

If the waste heat from the combustion engine is less than the heat fed in via the additional heating, the expediency of the reduction of the coolant mass flow according to the invention becomes obvious: if, for example, the engine waste heat is 1 kW and the coolant mass flow through the passenger compartment heat exchanger is reduced in such a manner that the boiling point of the coolant is virtually reached after 4 kW additional heating capacity are input, the coolant outlet temperature from the passenger compartment heat exchanger is very low in the process according to the invention, with virtually all of the additional heat and the necessary engine cooling capacity of 1 kW being used for the passenger compartment. This situation exists in electric vehicles, in particular, in which the waste heat from the power control system may possibly also be used in addition to the waste heat of the motor by means of the process according to the invention.

When using the process according to the invention, it is thus necessary to increase the coolant temperature available at the passenger compartment heat exchanger by a certain amount by means of the additional heating if the coolant mass flow is reduced—assuming that the basic level of the engine inlet and outlet temperatures is reduced. In comparison with hitherto known processes, this necessitates only a moderate increase in the coolant temperature at the inlet to the passenger compartment heat exchanger. Accordingly, in comparison with hitherto known processes, a lower coolant temperature at the engine outlet is necessary in order to maintain a specified heating capacity in the passenger compartment heat exchanger. The ratio of the heat lost to the surrounding environment via the surface of the engine and the coolant lines to the non-increased heating capacity at the passenger compartment heat exchanger can thus be drastically reduced in comparison with a configuration without additional heating. Despite an unchanged passenger compartment heating capacity, the capacity of the additional heating can thus ultimately be throttled.

Even in engines with a bypass in the coolant circuit, the reduction of the coolant flow through the additional heating and the passenger compartment heat exchanger according to the invention causes a significant improvement. However, as mixing of the coolant flow transported through the bypass line and the coolant flow from the passenger compartment heat exchanger branch produces an elevated mixing temperature at the engine inlet, the advantages compared with conventional processes are somewhat smaller in this case.

As already described, the process according to the invention is based on a significant reduction of the heat lost to the surrounding environment. If the coolant line leading from the engine to the passenger compartment heat exchanger and that leading from the passenger compartment heat exchanger outlet to the engine are additionally insulated and/or their cross-section is reduced, which is not usually a problem if the coolant flow is reduced, this results in a further reduction of the heat lost to the surrounding environment.

The reduction of the coolant flow through the additional heating and passenger compartment heat exchanger or through the engine according to the invention, which, as already mentioned, can be controlled via valves or realised through the structural design of the line cross-sections, thus represents a highly effective measure for increasing the heating capacity in the passenger compartment by reducing the heat lost to the surrounding environment. In this context, when using actuators (valves or switchable throttles), the heating capacity of the additional heating is concentrated on the passenger compartment if required, ultimately resulting in an increase in the temperature of the fresh air conveyed into the interior of the vehicle.

Configurations are known for heat exchangers for heating the passenger compartments of motor vehicles with the waste heat of the drive engine via a cooling medium, where the heat of the cooling medium is exchanged with the passenger compartment air via a passenger compartment heat exchanger in order to heat the passenger compartment.

However, particularly according to the above, there is a need for efficient and low-cost heating of the passenger compartment air while reducing the heat lost to the surrounding environment, as well as for a reduced installation volume and weight. In particular, such a heat exchanger configuration should necessitate as few modifications as possible to the existing vehicle components and, if necessary, be easy to exchange for conventional heat exchanger configurations or easily manufactured using their components.

Such a heat exchanger is characterised by the features of claim 39, the following subclaims describing advantageous configurations. The heat exchanger configuration according to the invention can be used particularly advantageously in conjunction with the process claimed according to the invention, as well as with the device for implementing the process.

The drastic reduction of the coolant mass flow through the passenger compartment heat exchanger pursuant to the process according to the invention thus permits considerably smaller flow cross-sections of the heat exchanger pipes, as well as smaller cross-sections of the coolant lines upstream and downstream of the passenger compartment heat exchanger, the pressure of the coolant pump remaining unchanged and with a corresponding design of the cooling fins provided on the heat exchanger pipes. At the same time, the heat exchanger configuration according to the invention displays considerably better heat transfer owing to its counterflow characteristics, meaning that the number of heat exchanger fins can be reduced. In general, the mass of the heat exchanger and the mass of the coolant lines can thus be reduced, owing to a reduced circumference and lower wall thickness, as can the mass of the coolant. The response behaviour of the passenger compartment heating can be improved as a result. Furthermore, the reduction of the heat lost from the hose lines to the surrounding environment resulting from the passenger compartment heating system according to the invention, which can be improved even further by suitable integration into the cooling circuit of the engine, is of significance. This reduction relates to both the reduced surface area of the hose lines and, in particular, the reduced temperature of the coolant lines leading from the passenger compartment heat exchanger back to the engine. The heat lost at the coolant pump and the crankcase of the engine can be especially reduced by increasing the pressure of the coolant feed pump and the pressure loss at the passenger compartment heat exchanger.

The coolant flow through the passenger compartment heat exchanger is advantageously reduced by around 50% and more in comparison with today's conventional values, the coolant throughput particularly being lower than 1 1/min per kW heating capacity transferred to the passenger compartment air when using today's conventional water/glycol mixture at a low engine speed and an ambient temperature of −20° C. The inside diameter of the coolant line connected to the passenger compartment heat exchanger is advantageously less than 11 mm in passenger cars.

According to the invention, a device for implementing the process is characterised in that at least 3 cross-flow heat exchangers connected in series are used as the counterflow heat exchanger configuration, the passenger compartment air being heated in at least 3 stages and the coolant being cooled via these 3 stages.

BRIEF DESCRIPTION OF THE DRAWINGS

An example of the invention is described below and illustrated on the basis of the figures. The figures show the following.

DESCRIPTION OF THE PREFERRED EMBODIMENTS

Figure 1:
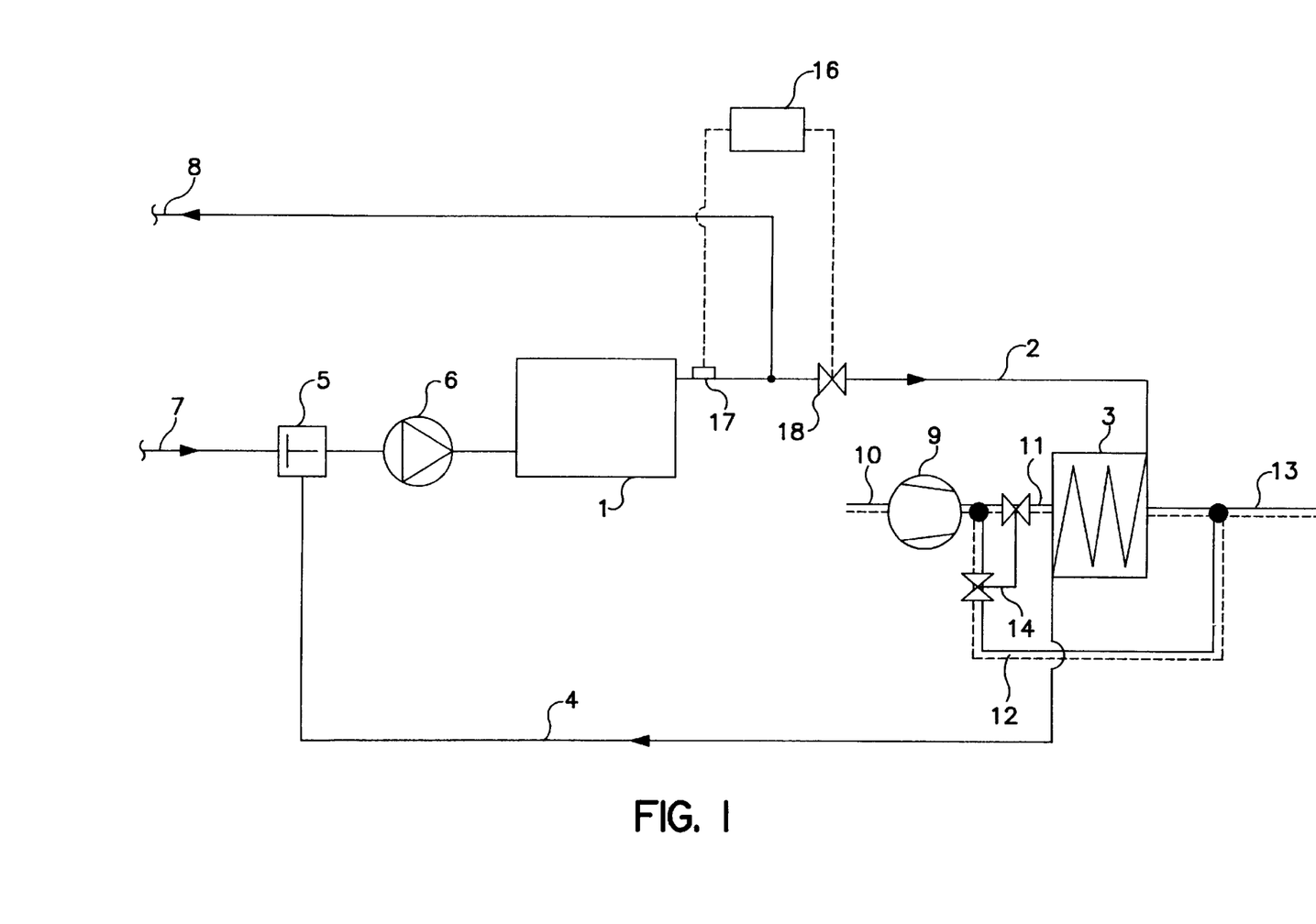
FIG. 1 A schematic representation of a device according to the invention with counterflow heat exchanger and air-side control, FIG. 2 A schematic representation of a device according to the invention with counterflow heat exchanger and coolantside control, FIG. 3 A schematic representation of a device according to the invention with counterflow heat exchanger and water-side bypass, FIG. 4 A schematic representation of a further configuration of the device according to the invention with counterflow heat exchanger, FIG. 5 A schematic representation of a device according to the invention with a bypass which can be closed via a throttle, FIG. 6 A schematic representation of a device according to the invention with counterflow heat exchanger and additional heating, FIG. 7 A further configuration with additional heating, FIG. 8 A schematic representation of a heat exchanger based on the counterflow principle (8a) and a conventional heat exchanger based on the cross-flow principle (8b), FIG. 9 A further configuration of a heat exchanger based on the counterflow principle, FIG. 10 A schematic representation of a heat exchanger configuration with counterflow heat exchanger.

In the configuration with air-side control of the passenger compartment temperature shown in FIG. 1, the liquid coolant is transported from engine 1 via feed line 2 to passenger compartment heat exchanger 3 and then via return line 4, thermostat 5 and coolant pump 5 back to engine 1. In this context, it must be noted that thermostat 5 largely closes the large cooling circuit—indicated by lines 7 and 8—as long as no excess waste heat is available.

The heat transferred to the passenger compartment is controlled by adjusting the fresh-air mass flow transported from line 10 through line 11 via passenger compartment heat exchanger 3 and line 13 into the passenger compartment with the help of blower 9. In this context, the temperature of the air transported via numerous nozzles into the passenger compartment is a mixed temperature of the air masses distributed to lines 11 and 12 via control valve 14. In some applications, the control valve is also positioned downstream of the passenger compartment heat exchanger.

In an advanced development of the heating circuit according to the invention, passenger compartment heat exchanger 3 is designed as a counterflow heat exchanger with switchable throttle 18, the throttle being activated by means of manual or automatic switches or controls. To this end, sensor 17 can be used in connection with electronics 16, for example. It is now important that the coolant flow is not throttled with the help of throttle 18 with the aim of reducing the heating capacity in the passenger compartment, but that throttling is used to increase the effective heating capacity in the passenger compartment. In other words: "Throttle open" means reduced heating capacity in the passenger compartment, but a warmer engine block; "Throttle activated" means increased heating capacity in the passenger compartment, but a cooler engine block, although the area of the combustion chamber walls still remains warm in both throttle positions.

In the event of reduced heating capacity requirements, the precision control must ensure that thermostat 5 for the large coolant circuit is not opened by an excessive increase in the coolant temperature in this context. The control system in a particularly expedient form of the process according to the invention therefore reduces the throttling of the coolant throughput if a precisely defined upper limit of the coolant temperature is reached.

In cases where only the heating capacity deficit in the passenger compartment under extreme climatic conditions is to be remedied and where it is otherwise unnecessary to use the available waste heat as efficiently as possible, the switchability of throttle 18 can be dispensed with and a fixed throttle installed. In this context, the dimensions of the coolant-side flow cross-sections of passenger compartment heat exchanger 3 can also assume the throttle function. In this application without a switchable throttle, thermostat 5 of the large cooling circuit must be open, if the coolant energy is not to be dissipated from passenger compartment heat exchanger 3. In contrast to the optimum version with switchable throttle described above, this means that the waste heat can not be optionally concentrated on the passenger compartment or engine 1 and can only be directly transferred to the surrounding environment in a small number of exceptional situations. However, it may be advantageous to dispense with the benefits of keeping the engine block as warm as possible for cost reasons.

Depending on the design of thermostat 5, it may be necessary to move this from the position illustrated in FIG. 1, and locate it at the coolant outlet of the engine. It is then ensured that the engine does not overheat, particularly in the event of extreme reduction of the coolant mass flow through the passenger compartment heat exchanger, even without an additional temperature sensor.

Instead of using throttle 18, the speed of the coolant pump can also be varied in order to adjust the coolant mass flow through the passenger compartment heat exchanger. Alternatively, an electric pump can also be used, in which the coolant mass flow is adjusted by activation and deactivation, as well as pole reversal or closed-loop control, for example.

Figure 2:
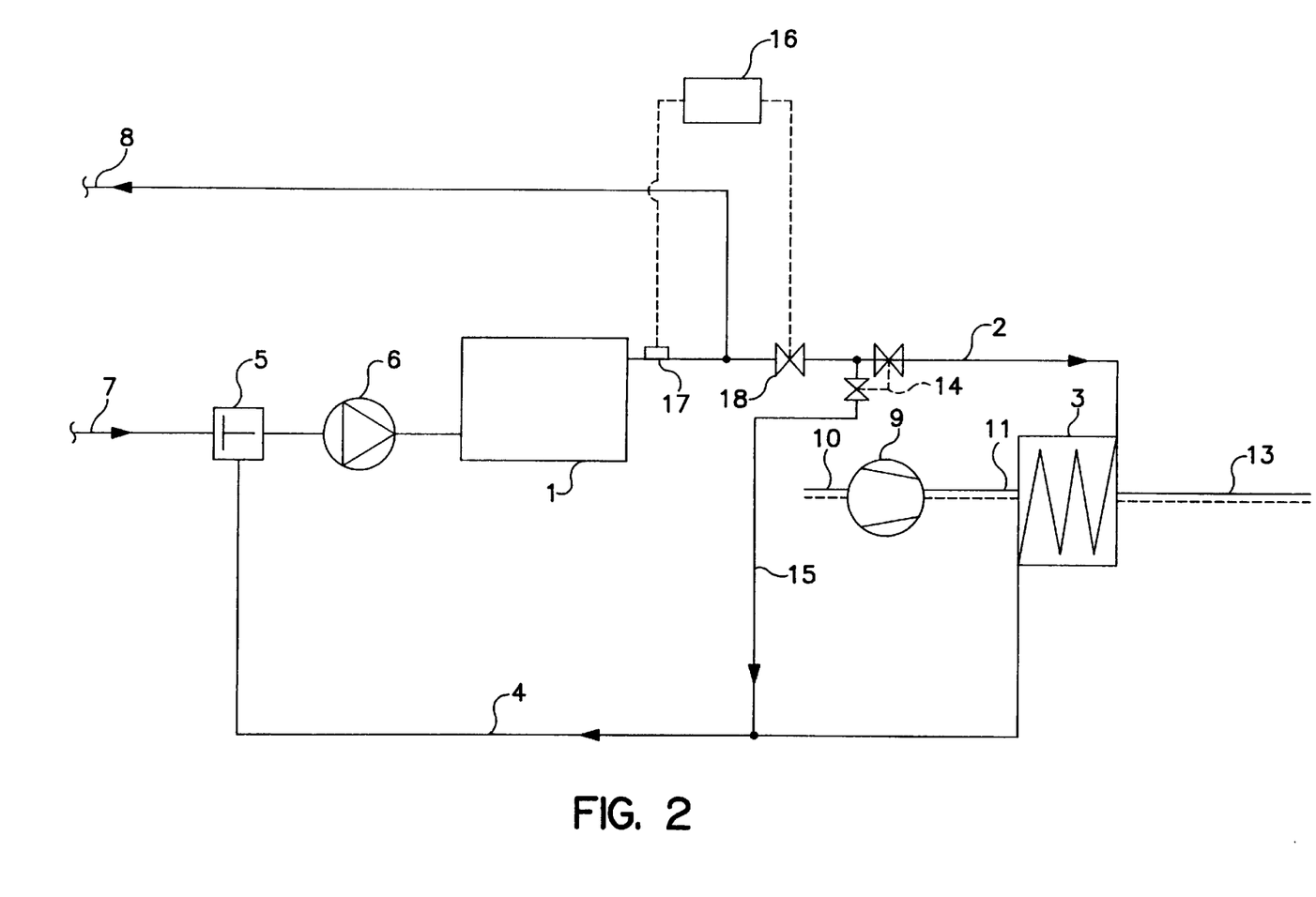

FIG. 2 shows a corresponding circuit with coolant-side control. Here, control valve 14 opens water-side bypass 15 in order to is, reduce the amount of heat transferred to the passenger compartment.

Figure 3:
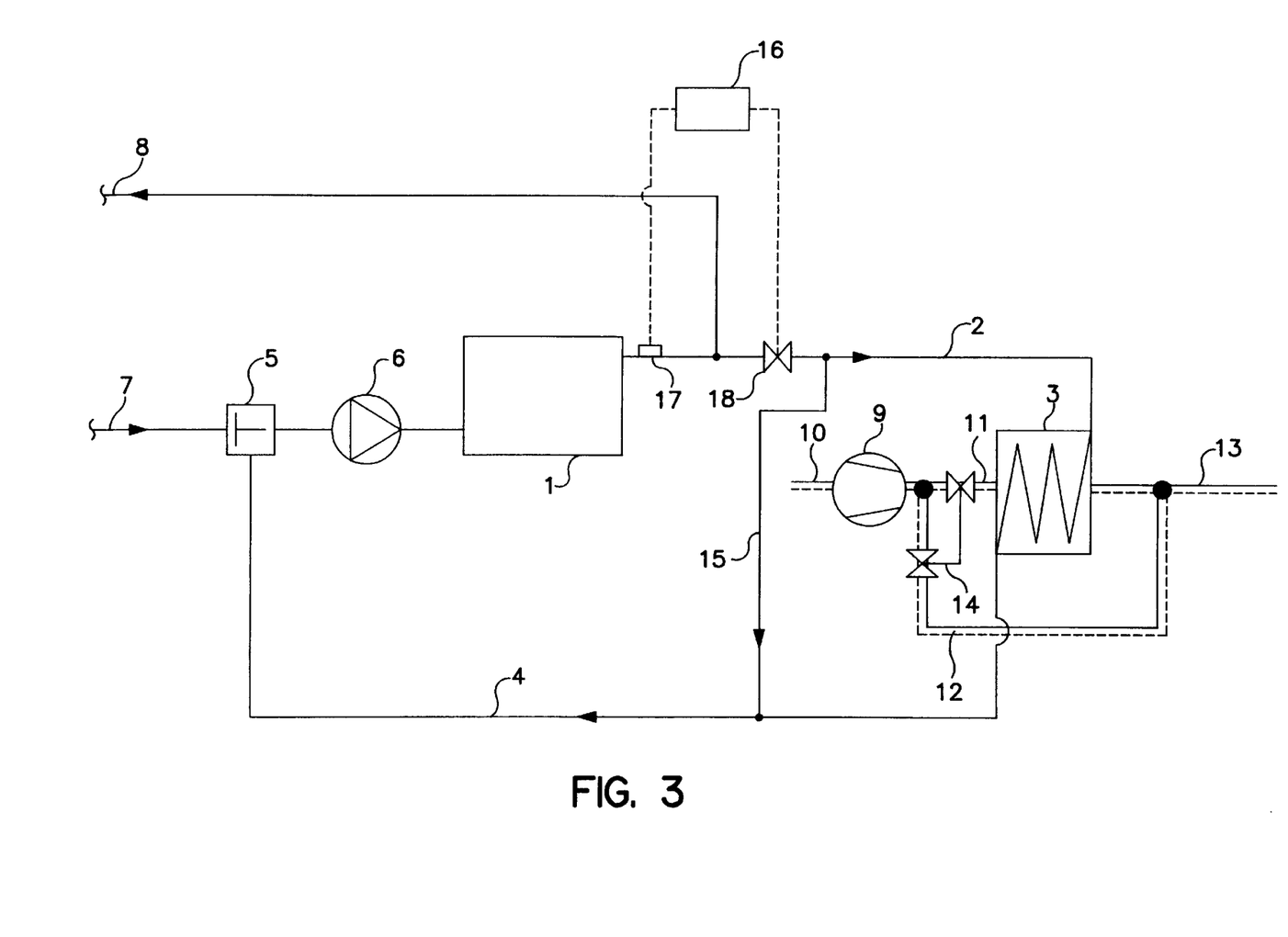

In the coolant circuit shown in FIG. 3, a water-side bypass 15 is provided within the small cooling circuit in addition to the circuit illustrated in FIG. 1, meaning that only part of the coolant transported in the small cooling circuit flows via the passenger compartment heat exchanger. This is primarily used for temperature-sensitive engines in order to achieve as homogeneous a temperature distribution as possible in the engine block and cylinder head.

Figure 4:
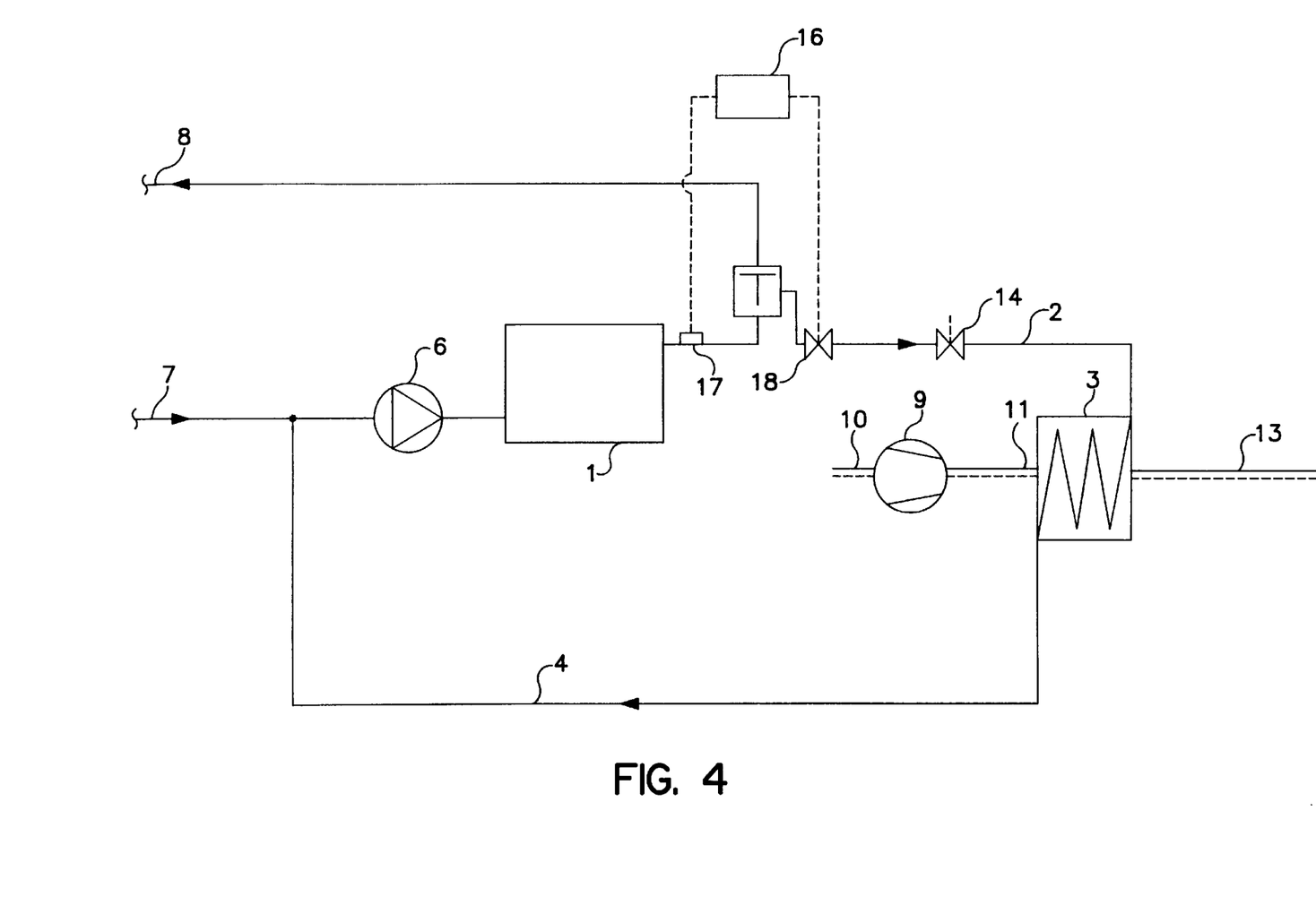

The circuit shown in FIG. 4 is primarily used in temperature-sensitive engines with a corresponding design of the engine-side coolant ducts. In order to reduce the heating capacity, the coolant flow through the passenger compartment heat exchanger is reduced and even completely blocked in extreme cases.

In the practical examples shown in FIGS. 1 to 4, thermostat 5 can also be located at the fork of the large cooling circuit (line 8) at the engine outlet.

In this context, it must be mentioned that throttle 18 in FIGS. 1 and 2 can be integrated in control valve 14 by means of a suitable design.

Another version (FIG. 5) only reduces the coolant flow through the engine by partially or completely closing bypass 15 via throttle 18. If the dimensions of passenger compartment heat exchanger 3 are suitable, the coolant mass flow through engine 1 is reduced in this context, while the coolant mass flow through passenger compartment heat exchanger 3 increases. The coolant temperature at the engine outlet thus rises, as does the heat lost by feed line 2 to the surrounding environment, however. Furthermore, the coolant outlet temperature from passenger compartment heat exchanger 3 is elevated compared to the optimum version, meaning additional heat is lost via return line 4 and the engine block. However, if the coolant flow through passenger compartment heat exchanger 3 is set a priori to a considerably lower value than for today's conventional systems with cross-flow passenger compartment heat exchangers by means of a corresponding pressure loss, for example, the coolant temperature at the passenger compartment heat exchanger outlet remains at a reduced level, even after increasing the flow by closing valve 18. In conjunction with the improved heat utilisation rate in the passenger compartment resulting from the increase in air temperature at the passenger compartment heat exchanger outlet, this still leads to a significant increase in the effective heating capacity in the passenger compartment.

Figure 5:
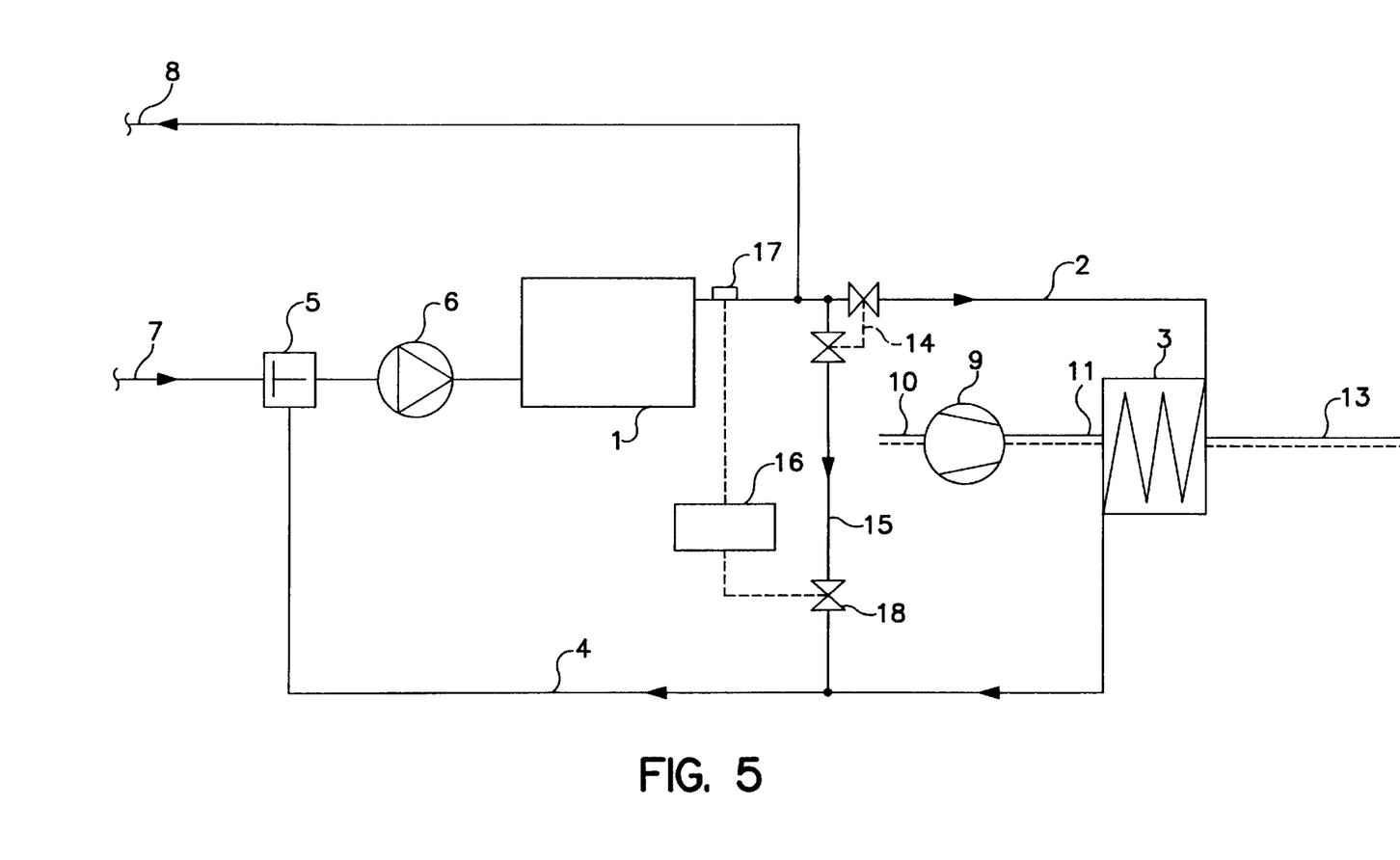

Conversely, it is sometimes also more favourable not to position throttle 18 in bypass 15, as shown in FIG. 5, but to locate it directly in the line leading through passenger compartment heat exchanger 3, i.e. downstream of control throttle 14, especially in engines in which bypass 15 is arranged very close to or even inside the engine. This results in an unchanged, uniform temperature distribution within engine 1, which is particularly advantageous for engines subject to high loads, while simultaneously reducing the heat lost to the surrounding environment. As already described, this applies to the coolant lines, as well as to the advantages as regards the temperature level of the air transported into the passenger compartment. In this version, the switch to non-adjustable throttling, particularly through the passenger compartment heat exchanger and the coolant lines, is extremely simple. This is of particular advantage for applications with additional heating 19.

The switchable throttle will probably often be able to be replaced by a self-regulating throttle which generates a greater relative drop in pressure in the event of a low coolant mass flow, i.e. also at low engine speeds than at high speeds, such as a spring-loaded non-return valve, preferably with a degressive spring characteristic.

Figure 6:
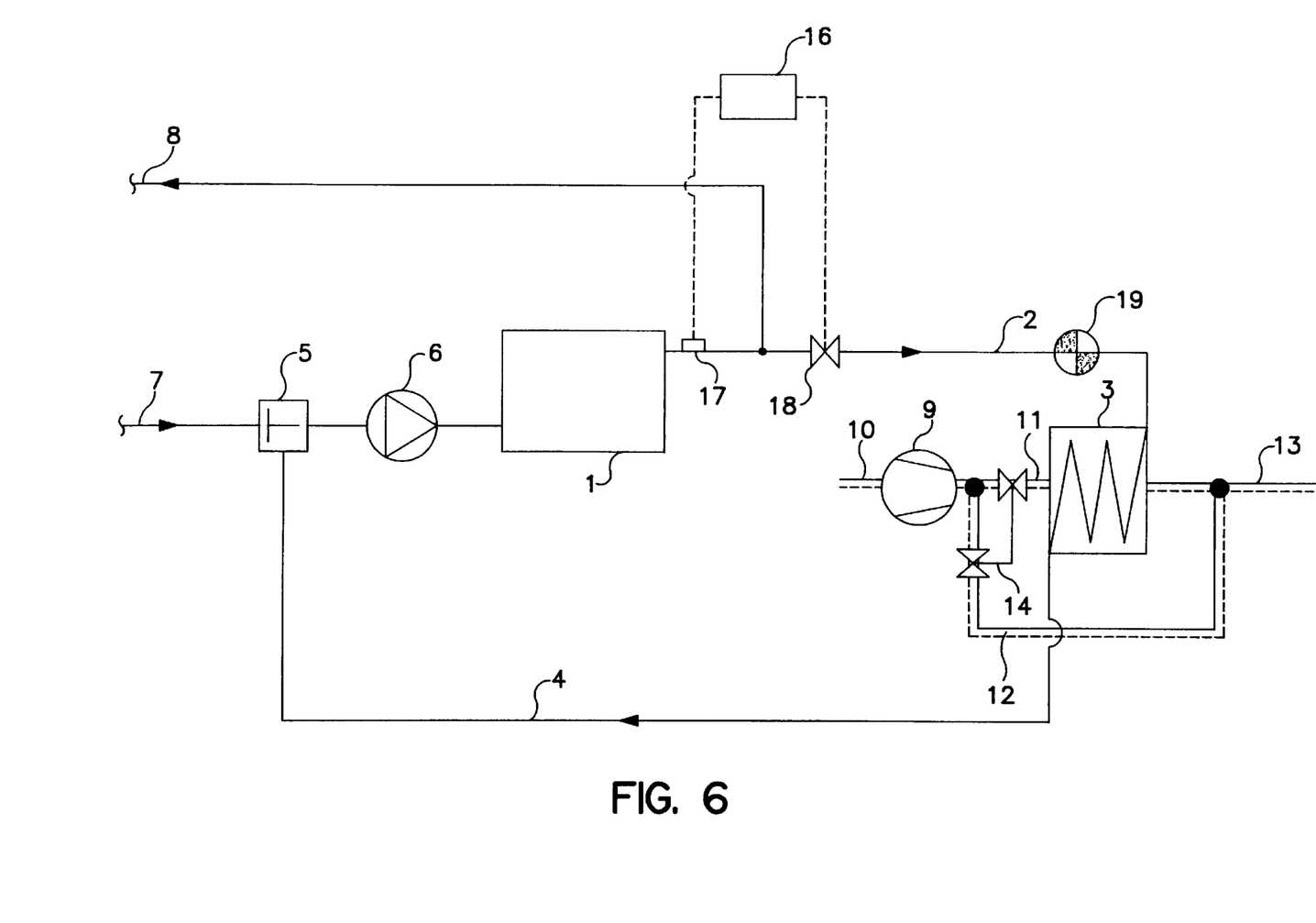
Figure 7:
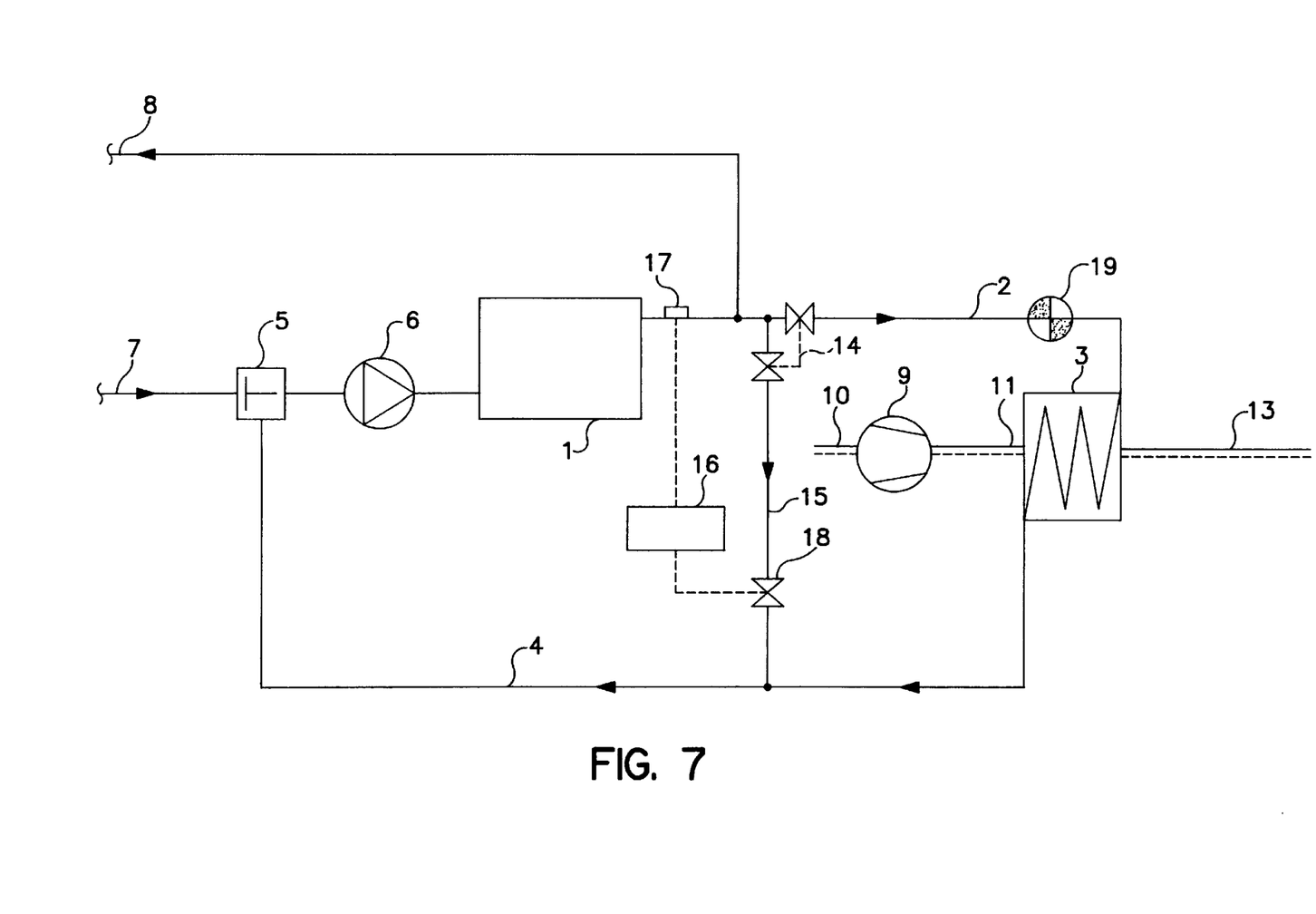

FIG. 6 shows a device for heating a passenger compartment with additional heating 19, using the waste heat from engine 1. The coolant is transported from engine 1 via feed line 2 into additional heating 19 to passenger compartment heat exchanger 3 and then via return line 4, thermostat 5 and coolant pump 6 back to engine 1. Additional heating 19 can, for example, consist of a unit run on liquid fuel, an electric heating coil or a heat accumulator in this context.

The heat transferred to the passenger compartment is controlled by activation and deactivation of additional heating 19, as well as by adjusting the air mass transported from line 10 through line 11 via passenger compartment heat exchanger 3 and line 13 into the passenger compartment with the help of blower 9. In addition to the reduction or deactivation of the heat supply via additional heating 19, the coolant flow through passenger compartment heat exchanger 3 can be largely reduced or completely blocked in order to reduce the heating capacity. The reduction of the air mass flow or the modification of the coolant mass flow through passenger compartment heat exchanger 3 is also used to adjust the power output in the passenger compartment in systems with on/off control of additional heating 19.

The simultaneous reduction of the coolant flow though additional heating 19 and passenger compartment heat exchanger 3 to increase the heating capacity in the passenger compartment when engine 1 is at operating temperature and additional heating 19 is switched on would be ineffective without the changes according to the invention, particularly in systems in which additional heating 19 only supplies a relatively small proportion of the heating capacity, as the air outlet temperature could only be slightly increased, even at full additional heating capacity, owing to the conventionally used cross-flow passenger compartment heat exchangers.

It goes without saying that additional heating 19 can also be used in the other devices according to the invention pursuant to FIGS. 1 to 4.

Figure 8A:
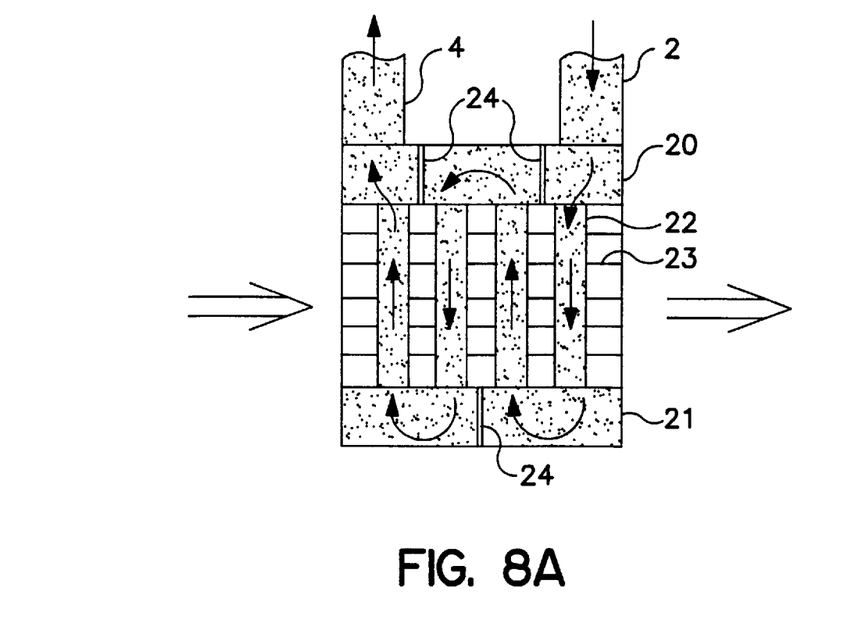
Figure 8B:
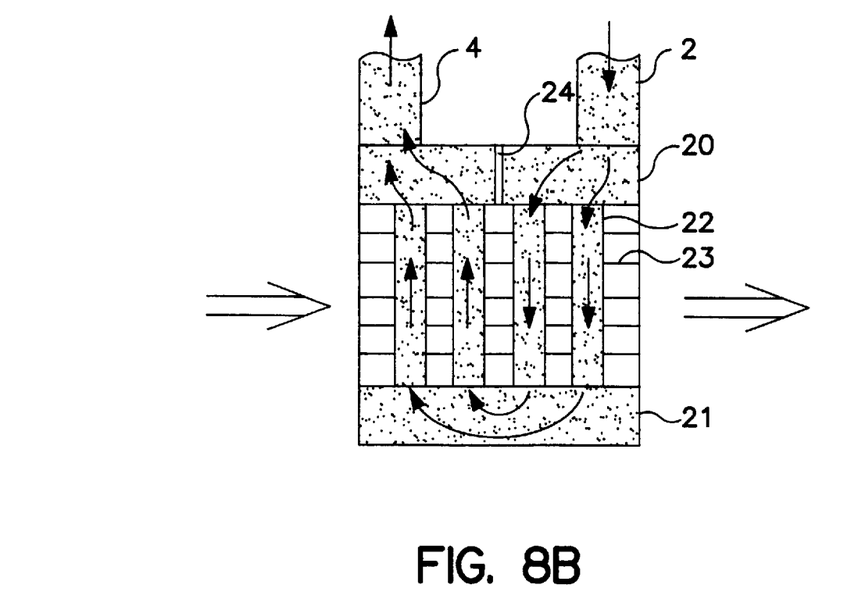

A counterflow heat exchanger configuration as shown in FIG. 8a is particularly suitable for integration in motor vehicles for geometrical reasons and owing to the specific advantages as regards installation. This configuration can be achieved by modifying a conventional passenger compartment heat exchanger of cross-flow design as shown in FIG. 8b for high heat transfer rates by increasing the number of partitions 7 within radiator tanks 20 and 21 from one partition to three.

If water inlet 2 and outlet 4 from the coolant systems are correctly connected, a certain counter-flow effect can already be achieved with conventional cross-flow heat exchangers, especially the dual-flow routing of heat exchanger pipes 22 which transport coolant and connect the two radiator tanks 20 and 21, these pipes transferring the heat via cooling fins 23 to the air fed into the passenger compartment, although this shows that the system has been optimised to achieve the highest possible coolant flow. The configuration pursuant to FIG. 8a can be achieved by simple modification of the housing by increasing the number of partitions 24 provided within radiator tanks 20 and 21 from one partition to three.

This inevitably results in a reduction of the coolant mass flow through passenger compartment heat exchanger 3 owing to an increase in the pressure loss, as a result of doubling the flow length, and due to increased turbulence losses at the inlet and outlet of the coolant flow into the individual heat exchanger pipes 22 owing to an increased coolant flow velocity.

Depending on the design of the small cooling circuit, with or without a coolant bypass 15 close to the engine and parallel to passenger compartment heat exchanger 3, the delivery pressure of coolant pump 6 is more or less greatly increased when the passenger compartment heat exchanger 3 according to FIG. 8a is used. The coolant line cross-sections or heat exchanger pipe cross-sections may have to be adjusted in order to precisely adapt the coolant flow to a greatly reduced level in comparison with the values for conventional cross-flow heat exchangers. If the engine cooling circuit displays a small cooling circuit with a coolant bypass close to the engine and parallel to the passenger compartment heat exchanger circuit, the passenger compartment heat exchanger can be used without taking the cross-sensitivities as regards engine cooling into consideration, as the extreme condition of a completely blocked coolant flow through the passenger compartment heat exchanger is already taken into account in conventional configurations. When defining the coolant throughput according to the invention, it only has to be ensured that the coolant flow through the passenger compartment heat exchanger in the region of low engine loads and pump speeds is exactly high enough that sufficient thermal energy is transported to the passenger compartment heat exchanger and that the air temperature is simultaneously not too "saturated".

The original diameters of coolant feed and return lines 2 and 4 are obviously too large if the coolant throughput is greatly reduced. The line cross-sections at the passenger compartment heat exchanger and at the coolant hoses, as well as the thickness of the hose walls, can thus be reduced. Furthermore, the dimensions of heat exchanger pipes 22 and of the heat exchanger fins can be reduced in comparison with conventional arrangements.

Figure 9:
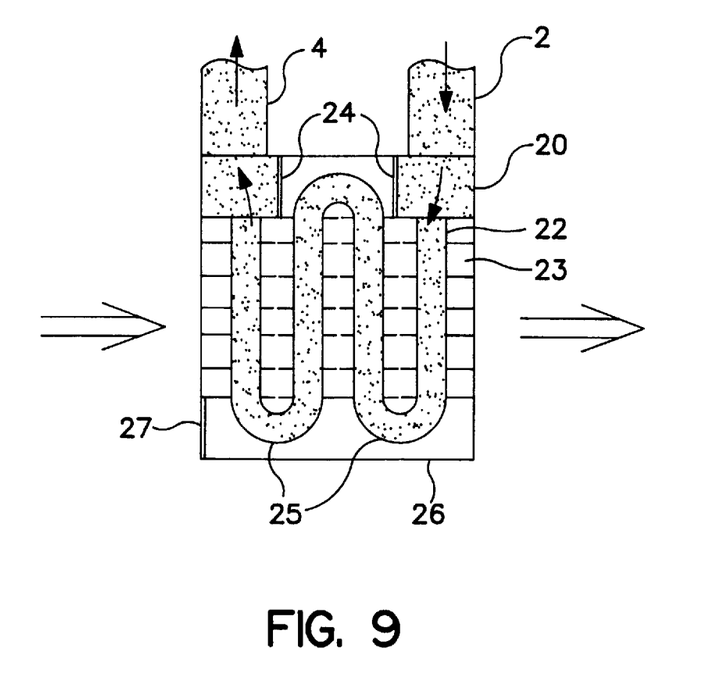

The configuration shown in FIG. 9 illustrates a heat exchanger in which the cross-flow heat exchangers are connected in series via heat exchanger pipes 22 with parallel flow in conjunction with semicircular flow diverters 25, meaning that the passenger compartment air is heated in four stages and the coolant cooled via these four stages in this manner. This particularly results in a reduction of the pressure loss on the coolant side, as the flow losses at the inlet and outlet of heat exchanger pipes 22 are lower. This is of particular significance in the heat exchanger according to the invention, as this displays a relatively high coolant flow velocity in the heat exchanger pipes, depending on the application, meaning that high impetus and thus pressure losses result, particularly at points of discontinuity and at the flow outlets of the individual heat exchanger pipes 22 in a heat exchanger according to FIG. 8a.

Furthermore, the surface of radiator tank 20 in contact with the coolant, or the volume filled with coolant in the configuration according to FIG. 8a, is considerably reduced. Radiator tank 21 according to FIGS. 8a, b, is completely dispensed with and is replaced by housing 26 which is primarily in contact with air. The special design of radiator tank 20 and housing 26 results in a further reduction of the thermally active mass. The flow through housing 26 can be prevented by a special panel 27 with a corresponding bending radius of heat exchanger pipes 22.

A heat exchanger according to the invention can be manufactured by providing all parallel heat exchanger pipes 22 with the necessary fins 23 in an initial step, before bending the semicircular flow diverters 25, and then installing radiator tanks 20 and 21. This ensures that no heat is conducted against the direction of flow within fins 23.

Furthermore, the coolant feed and return lines on radiator tanks 20 and 21 display a nozzle or diffuser-like zone within the radiator tank, or outside it as an option, to improve the flow behaviour, meaning that coolant-side pressures losses in the passenger compartment heat exchanger are reduced. Like the design of heat exchanger pipes 22, as shown in FIG. 9, this is also of crucial importance for the present invention, particularly in connection with the reduction of the flow cross-sections of the coolant lines, as well as with an increase of the flow velocity in the coolant lines in order to minimise the heat lost to the surrounding environment and the thermally active mass.

Figure 10A:
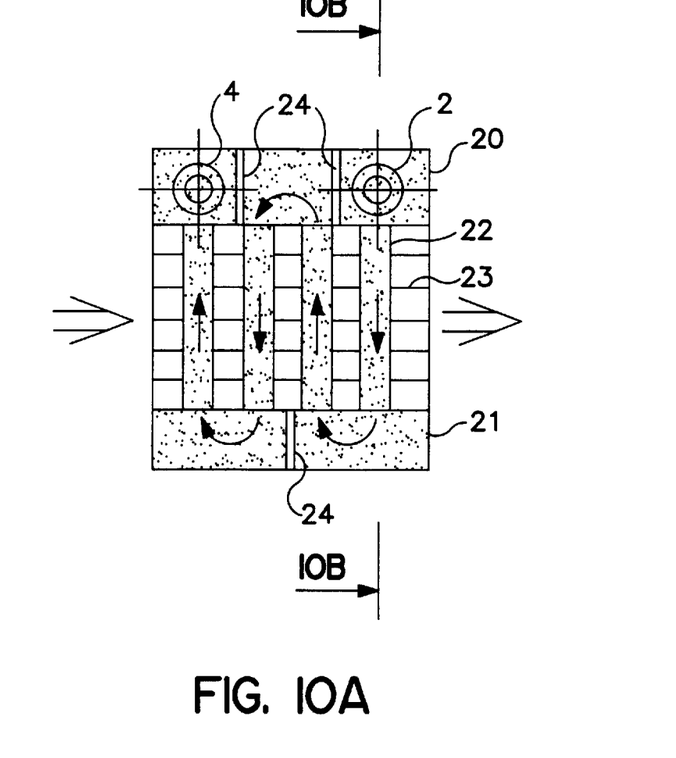
Figure 10B:
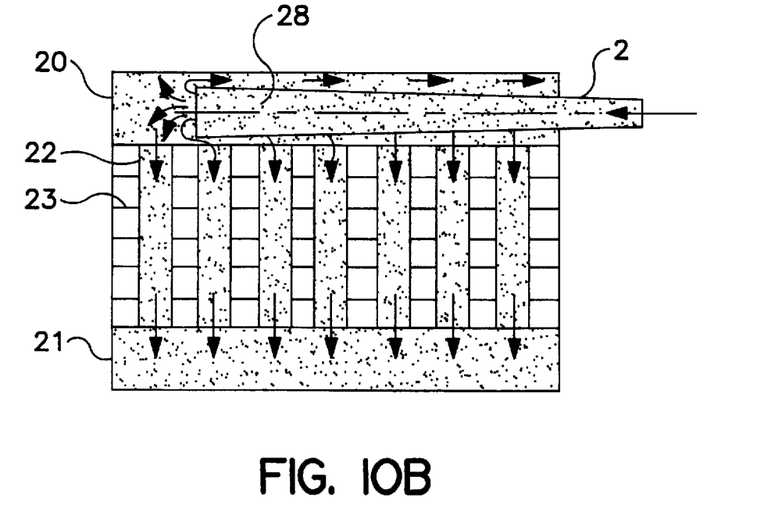

FIG. 10 shows a passenger compartment heat exchanger in which coolant inlet 2 and coolant outlet 4 are positioned laterally and in which the cross-sections of the lines in radiator tank 20 are widened. The cross-sections of the lines can also be widened outside radiator tank 20.

As illustrated in section A—A, the coolant fed into radiator tank 20 is decelerated by diffuser 28 with virtually no separation, meaning that the dynamic pressure of the coolant flowing in a considerably smaller hose in comparison with FIG. 8a and at a higher flow velocity can be at least partially recovered. Owing to the low flow velocity, not only are the discharge losses from coolant flow line 2 relatively low, but the flow losses during distribution to the individual heat exchanger pipes 22 are also low.

Return line 4, which collects the coolant and accelerates the flow to a relatively high velocity within the hose line again, displays similar advantages as regards the coolant flow flowing out of radiator tank 20.

Depending on the space required and the opening angle of the nozzle or diffuser 28, feed line 2 and return line 4 can be perforated in order to avoid flow separation.

In general, the flow coefficient of a cross-flow passenger compartment heat exchanger with dual-flow coolant routing of conventional design can virtually be achieved using the passenger compartment heat exchanger according to the invention. The passenger compartment heat exchanger according to the invention can be further improved by additionally designing the transitions to the comparatively thick coolant outlet and return line cross-sections on the engine as nozzles or diffusers. This saving of pressure losses can ultimately also be used to realise a further reduction of the line cross-sections.

Virtually the same effect as with a conventional counter-flow heat exchanger can be achieved by means of connecting a larger number of cross-flow heat exchangers in series.

As all four heat exchanger pipes 22 of the passenger compartment heat exchanger 3 shown in FIGS. 8a, b are connected via common heat exchanger fins 23, a certain proportion of the heat is transported against the direction of air flow by heat conduction in the fin. It is therefore expedient to interrupt heat exchanger fins 23 at least locally, or to locally reduce the wall thickness of these fins. In this context, it may be advantageous for manufacturing reasons to limit this to local interruptions or local reduction of the wall thickness in contrast to interruptions over the entire width of the fins.

The measures described for preventing heat conduction against the direction of air flow are preferably to be implemented in the centre, between the individual flows. A positive side-effect is that these measures also increase the turbulence of the air flow, and thus the heat transfer. If the demands on size are less stringent, heat conduction can, of course, also be checked by enlarging the gaps between the individual heat exchanger pipes.

I claim:

1. A process of heating a passenger compartment of a motor vehicle by means of waste heat given off by an engine via a fluid coolant, which is fed back to the engine through coolant lines via a passenger compartment heat exchanger in order to heat the passenger compartment a passenger compartment counterflow heat exchanger (3); upon the temperature in the passenger compartment dropping below a predetermined temperature, either reducing the mass flow of the fluid coolant through the engine (1) and the passenger compartment counterflow heat exchanger (3) or reducing the mass flow of the fluid coolant through the passenger compartment counterflow heat exchanger and concurrently providing additional heat at least intermittently towards a level determined by permissible limit values of engine cooling, and substantially simultaneously increasing the heating capacity transferred to the passenger compartment until the predetermined temperature is reached in the passenger compartment.

2. The passenger compartment heating process as defined in claim 1 wherein the fluid coolant mass flow through the engine (1) is reduced and the fluid coolant mass flow through the passenger compartment counterflow heat exchanger (3) is retained or increased, and the fluid coolant mass flow through the engine (1) is lower by at least a factor of 2 as compared to corresponding driving situations without maximum heating capacity requirements in the passenger compartment.

3. The passenger compartment heating process as defined in claim 1 wherein waste heat of the engine (1) is concentrated on the passenger compartment by reducing the fluid coolant mass flow in the event of a maximum heating capacity requirement and the reduction of fluid coolant mass flow is discontinued in the event of a reduced heating capacity requirement whereby a higher proportion of the waste heat is used for heating up the engine (1).

4. The passenger compartment heating process as defined in claim 1 wherein the reduction of the fluid coolant mass flow is partially or completely overridden as soon as ambient temperature exceeds a certain limit value.

5. The passenger compartment heating process as defined in claim 1 wherein the fluid coolant mass flow is only reduced in a lower to middle range of a characteristic diagram of the engine (1) and is deactivated if a specified nominal rpm speed or specified nominal torque of the engine (1) is exceeded.

6. The passenger compartment heating process as defined in claim 1 wherein the reduction of the fluid coolant mass flow is partially or completely overridden as soon as the temperature difference of the fluid coolant between an engine outlet and an engine inlet exceeds a specified upper limit.

7. The passenger compartment heating process as defined in claim 1 wherein the reduction of the fluid coolant mass flow is partially or completely overridden as soon as the temperature of the fluid coolant at an outlet of the engine (1) exceeds a specified upper limit.

8. The passenger compartment heating process as defined in claim 1 wherein the reduction of the fluid coolant mass flow is partially or completely overridden as soon as vapour pressure or pressure pulsation of the fluid coolant exceeds a specified upper limit.

9. The passenger compartment heating process as defined in claim 1 wherein the fluid coolant mass flow is reduced by the dimensioning of the coolant lines cross-sections and/or via the geometry of the passenger compartment counterflow heat exchanger (3) and the fluid coolant mass flow is controlled by opening and closing a thermostat (5) located in a large cooling circuit of the motor vehicle.

10. The passenger compartment heating process as defined in claim 1 wherein the fluid coolant mass flow is reduced until the coolant temperature at an outlet from the passenger compartment counterflow heat exchanger (3) reaches a specified lower limit.

11. The passenger compartment heating process as defined in claim 1 wherein the fluid coolant mass flow is reduced until the coolant at an outlet from the passenger compartment counter-flow heat exchanger (3) reaches a specified temperature difference relative to the engine outlet temperature.

12. The passenger compartment heating process as defined in claim 1 wherein the fresh-air flow through the passenger compartment counterflow heat exchanger (3) is reduced when the fluid coolant mass flow is reduced.

13. The passenger compartment heating process as defined in claim 12 wherein fresh-air flow through the passenger compartment counterflow heat exchanger (3) is only reduced if the temperature or humidity of the ambient air drops below a certain limit value.

14. The passenger compartment heating process as defined in claim 12 wherein the fresh-air flow through the passenger compartment counterflow heat exchanger (3) is only reduced if the temperature of the engine (1) or the temperature of the coolant at an inlet to the passenger compartment counterflow heat exchanger (3) exceeds a certain limit value.

15. The passenger compartment heating process as defined in claim 12 wherein the fresh-air flow through the passenger compartment counterflow heat exchanger (3) is only reduced if the humidity of the passenger compartment air drops below a certain limit value.

16. The passenger compartment heating process as defined in claim 1 wherein the reduction of the fluid coolant mass flow can be manually deactivated.

17. The passenger compartment heating process as defined in claim 1 wherein the motor vehicle is driven by an electric motor, and at least a part of the heating capacity for the passenger compartment is generated by controlling electric propulsion power of the electrical motor driven vehicle.

18. The passenger compartment heating process as defined in claim 1 wherein the motor vehicle is the fluid coolant is routed via an additional heat source (19) to heat the passenger compartment.

19. The passenger compartment heating process as defined in claim 18 wherein the waste heat of the engine (1) and heat from an additional heat source (19) are concentrated on the passenger compartment by reducing the fluid coolant mass flow in the event of a maximum heating capacity requirement in the passenger compartment and the reduction of the fluid coolant mass flow is discontinued in the event of a reduced heating capacity requirement whereby a greater proportion of the waste heat is used for heating up the engine (1).

20. The passenger compartment heating process as defined in claim 19 wherein the reduction of the fluid coolant mass flow is partially or completely overridden as soon as the temperature of the fluid coolant at an outlet of the engine (1) or an outlet of the additional heat source (19) exceeds a specified upper limit.

21. The passenger compartment heating process as defined in claim 19 wherein the fluid coolant mass flow is reduced at exactly the same time as the additional heat source (19) transfers heat to the coolant.

22. The passenger compartment heating process as defined in claim 18 wherein the motor vehicle is driven by a combustion engine, and an exhaust gas/fluid coolant heat exchanger is used as the additional heat source (19).

23. A heating system comprising a passenger compartment of a motor vehicle which is heated by utilizing the waste heat given off by an engine of a motor vehicle, fluid coolant lines connect a passenger compartment counter-flow heat exchanger to a driving engine in order to heat the passenger compartment, and means are provided for reducing the fluid coolant mass flow through the engine (1) and/or the passenger compartment counterflow heat exchanger (3) in the event of the temperature in the passenger compartment dropping below a target value.

24. The heating system as defined in claim 23 wherein the passenger compartment counterflow heat exchanger (3) includes at least three cross-flow heat exchanger portions connected in series with passenger compartment air being heated in at least three stages and the fluid coolant being cooled via these three stages.

25. The heating system as defined in claim 24 wherein the series-connected cross-flow heat exchanger portions are arranged in a common housing (26), the cross-flow heat exchanger portions include pipes (22) through which the fluid coolant flows and heat exchanger fins (23) in contact with the pipes and the passenger compartment air whereby the passenger compartment air can be heated by means of the heat exchanger fins (23).

26. The heating system as defined in claim 25 wherein the common heat exchanger fins (23) heat the passenger compartment air for all cross-flow heat exchanger portions connected in series.

27. The heating system as defined in claim 26 wherein the heat exchanger fins (23) are constructed and arranged such that heat conduction along the heat exchanger fins (23) against the direction of flow of the passenger compartment air fed through the heat exchanger is reduced.

28. The heating system as defined in claim 27 wherein recesses are provided in the heat exchanger fins (23) in an area between the pipes (22) conveying the fluid coolant to interrupt heat conduction against the direction of air flow, and/or that the thickness of the heat exchanger fins (23) is locally reduced, and/or that a gap between the pipes (22) conveying the fluid coolant is of such dimensions that the heat conduction against the direction of flow of the passenger compartment air fed through the heat exchanger (3) is negligible.

29. The heating system as defined in claim 28 wherein a fluid coolant line (2) from the engine (1) to the passenger compartment heat exchanger (3) at least partially includes a considerably smaller flow cross-section than a fluid coolant line (4) leading from the passenger compartment heat exchanger (3) to the engine (1).

30. The heating system as defined in claim 28 wherein a fluid coolant line (2) from the engine (1) to the passenger compartment heat exchanger (3) is at least partially better insulated against the surrounding environment that a fluid coolant line (4) leading from the passenger compartment heat exchanger (3) to the engine (1).

31. The heating system as defined in claim 30 wherein the inside diameter of the fluid coolant lines (2,4) connected to the passenger compartment heat exchanger (3) is less than 11 mm in passenger cars.

32. The heating system as defined in claim 30 wherein a nozzle-like reduction of the fluid coolant line cross-section, which permits largely separation-free coolant flow, is provided in the vicinity of the fluid coolant outlet from the engine (1).

33. The heating system as defined in claim 30 wherein a diffuser-like expansion of the fluid coolant line cross-section, which permits largely separation-free coolant flow, is provided in the vicinity of a fluid coolant inlet into the engine (1) and/or into the housing of a fluid coolant pump (6) and/or in the vicinity of a heat exchanger inlet.

34. The heating system as defined in claim 30 wherein the fluid coolant line (2) leading away from the engine (1) exchanges heat with the engine oil.

35. The heating system as defined in claim 30 wherein an additional heat source (19) is provided to heat the passenger compartment and the fluid coolant mass flow is reduced when the additional heat source (19) transfers heat to the fluid coolant.

36. The heating system as defined in claim 30 wherein the fluid coolant mass flows through the additional heat source (19) and the passenger compartment counterflow heat exchanger (3) is reduced via the dimensioning of the coolant lines and/or via the geometry of the passenger compartment heat counterflow exchanger (3).

37. The heating system as defined in claim 30 wherein the heat source (19) is an exhaust gas/coolant heat exchanger.

38. The heating system as defined in claim 30 wherein the vehicle engine includes an external exhaust gas recirculation system, and the heat source (19) is an exhaust gas/coolant heat exchanger in the external exhaust gas recirculation system.

39. The heating system as defined in claim 30 wherein the heat source (19) is a fuel-fired burner, an electric heating system or a heat accumulator.

40. A heat exchanger system particularly adapted for heating a passenger compartment of a motor vehicle by means of the waste heat given off by an engine (1) with a low amount of waste heat via circulated fluid coolant comprising a plurality of heat exchanger pipes through which fluid coolant flows and which are in thermal contact with the air adapted to be fed into a passenger compartment, at least three cross-flow heat exchangers connected in series such that the heat transfer process has counterflow characteristics owing to corresponding routing of the air flow whereby passenger compartment air is heated in at least three stages and the fluid coolant is cooled via said three stages and wherein the cross-flow heat exchangers each include several heat exchangers pipes arranged parallel to one another, and the heat exchanger pipes include at least two semicircular flow diverters.

41. The heat exchanger as defined in claim 40 wherein the heat exchanger pipes (22) include heat exchanger fins (23), recesses are provided in the heat exchanger fins (23) in an area between the heat exchanger pipes (22) in order to interrupt heat conduction against the direction of air flow, and/or the thickness of the heat exchanger fins is locally reduced, and/or that the gap between the heat exchanger pipes is of such dimensions that the heat conduction against the direction of flow of the passenger compartment air fed through the heat exchanger (3) is negligible.

42. The heat exchanger as defined in claim 40 wherein the heat exchanger (3) includes a radiator tank (20) and the transition from the flow cross-section of a fluid coolant feed line (2) to the radiator tank (20) includes a diffuser-like expansion (28) of the pipe cross-section with a small opening angle, which permits largely separation-fee flow, in order to distribute the fluid coolant to the individual heat exchanger pipes (22), and/or that the transition from the radiator tank (20) to the cross-section of the coolant return line (4) includes a nozzle-like reduction of the pipe cross-section, which permits largely separation-free flow, in order to combine the fluid coolant originating from the individual heat exchanger pipes (22).

* * * * *